Aug. 4, 1959  A. E. BLOUNT ET AL  2,897,907
WEIGHT HANDLING MECHANISM
Filed Aug. 31, 1955  3 Sheets-Sheet 1

FIG. 1.

INVENTORS.
Alvie E. Blount, Tobias Flatow
Frank L. Chalmers.
BY
Frank S. Troidl
ATTORNEY.

Aug. 4, 1959　　A. E. BLOUNT ET AL　　2,897,907
WEIGHT HANDLING MECHANISM
Filed Aug. 31, 1955　　3 Sheets-Sheet 2

INVENTORS.
Alvie E. Blount, Tobias Flatow,
Frank L. Chalmers.
BY Frank S. Troidl
ATTORNEY Aug. 4, 1959  A. E. BLOUNT ET AL  2,897,907
WEIGHT HANDLING MECHANISM
Filed Aug. 31, 1955  3 Sheets-Sheet 3

INVENTORS.
Alvie E. Blount, Tobias Flatow,
Frank L. Chalmers,
BY Frank S. Troidl

ATTORNEY.

United States Patent Office 2,897,907
Patented Aug. 4, 1959

2,897,907

WEIGHT HANDLING MECHANISM

Alvie E. Blount, Tobias Flatow, and Frank L. Chalmers, Houston, Tex., assignors, by mesne assignments, to Jersey Production Research Company, Tulsa, Okla., a corporation of Delaware Application August 31, 1955, Serial No. 531,704

2 Claims. (Cl. 181—.5)

This invention relates to the art of seismic prospecting. More particularly, this invention relates to a new system for handling a heavy weight which is dropped upon the ground at successive intervals to generate seismic waves at each impingement upon the ground.

In seismic prospecting one of the methods utilized in obtaining records is to generate seismic waves from various points by means of explosives. The seismic waves generated are propagated through the earth's surface and if they should impinge upon a boundary of two media having different elastic properties, the seismic waves are reflected back to the earth's surface and detected by instruments such as geophones, which develop a voltage proportional to the amplitudes of the detected seismic waves. The recorded voltages generated by these instruments can be interpreted and the location of the reflecting boundary determined.

Instead of generating seismic waves by means of explosives, such waves may be generated by allowing a weight to impinge upon the earth's surface. Such a weight may weigh as much as six or seven thousand pounds. For efficient field operations, this weight must be dropped at intervals of about a few seconds and hence it is necessary for the obtaining of a sufficient number of good recordings that a means be devised to handle the weight efficiently.

Systems have been previously utilized by which the weight is attached to a hook mechanism connected to a winch on the end of a truck. When the hook mechanism is released, the weight is dropped upon the earth's surface. However, this procedure is subject to the objection that several seconds are required to reattach the weight to the hook.

Another procedure which has been utilized in the weight dropping method of seismic prospecting involves the use of a conventional A frame and power winch arrangement to handle the weight; a cable always remains attached to the weight. However, difficulties arise in the use of the foregoing equipment. First, because of the inertia of the unraveling cable and the spinning winch, a braking force must be applied to the winch immediately after the falling weight strikes the ground to prevent further unraveling of the cable. This braking force must necessarily be large and must be applied at precisely the right time. Equipment to apply and to time this braking force is considerable and when subjected to the strains of constant heavy duty use, the parts of even the best winches quickly fatigue and break.

Therefore, a system for handling a heavy weight utilized in seismic prospecting which is easy to handle and does not require any braking force and the parts of which are not subject to fatigue and breakdown is highly desirable.

It is an object, therefore, of this invention to provide a system for raising a heavy weight used in seismic prospecting and dropping said weight at time intervals which does not require the use of a heavy braking arrangement and which is not subject to fatigue and breakdown.

Briefly described, our new system consists of a heavy weight which is attached to the end of a cable in a "block and tackle" system. The "block and tackle" system includes therein a movable piston attached to one of the sheaves. The movable piston is hydraulically operated to raise the movable sheave thereby raising the heavy weight. Hydraulic means is provided for substantially instantaneously releasing the fluid from below the piston attached to the movable sheave thereby causing the piston to drop resulting in the substantially free fall of the heavy weight. All of the foregoing equipment is mounted on a truck so that after the weight has been dropped a hydraulic pump connected to the power drive of the truck will operate to feed fluid to the block and tackle system and raise the weight again to its uppermost position as the driver of the truck is driving to the next location where it is desired to drop the weight thereby utilizing time efficiently.

Other objects and a fuller understanding of the invention may be had by referring to the following description and claims taken in conjunction with the accompanying drawings in which:

Fig. 1 is a side elevational view of a truck showing our new weight handling mechanism;

Figure 4:
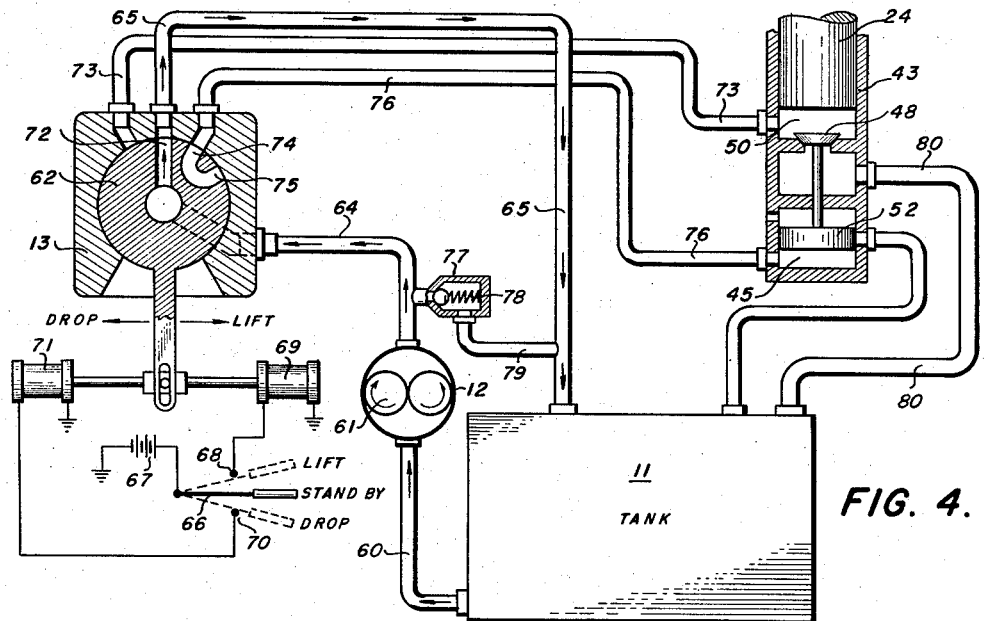
Fig. 4 is a diagrammatic view showing the hydraulic system and electrical means for controlling the control valve.
Figure 5:
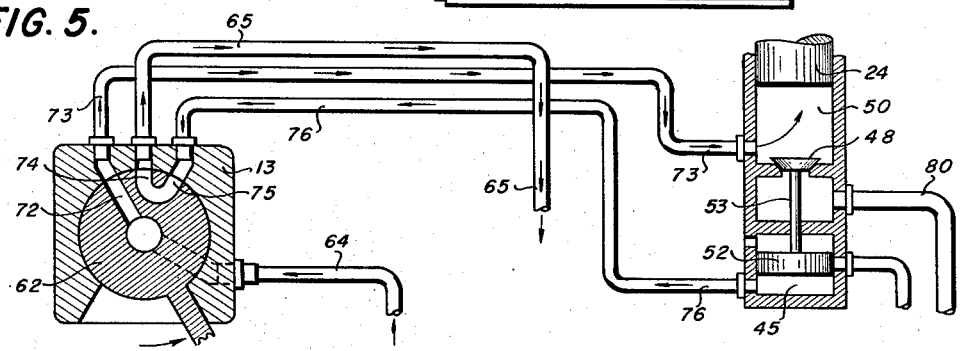
Figure 6:
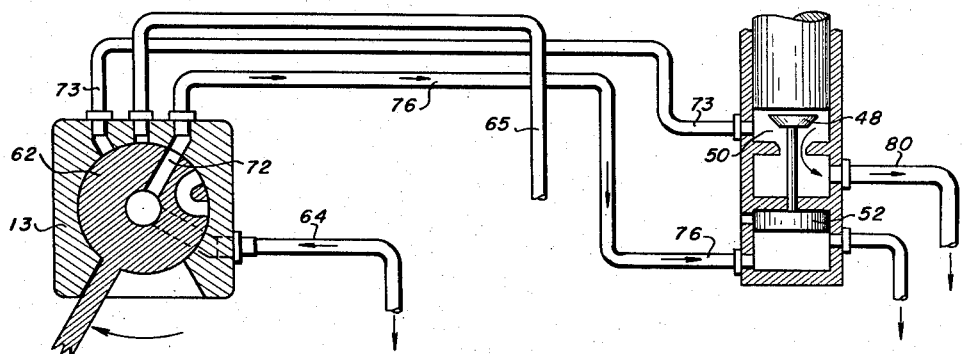

Fig. 5 is a diagrammatic view similar to Fig. 4 showing the positions of the control valve and block and tackle system when the weight is being raised; and Fig. 6 is a diagrammatic view of a portion of the hydraulic system showing the position of the control valve and the position of the block and tackle system when the hydraulic fluid is being discharged from below the cylinder to cause the free fall of the weight.

Referring to the drawings and more particularly to Fig. 1, numeral 10 refers to a truck upon which are mounted a hydraulic fluid tank 11, a fluid pump 12, a control valve 13, and a block and tackle system designated generally by the numeral 14. Attached to the back end of the truck 10 is a frame member 15 supporting a rotatable sheave 16. Arranged about the sheave 16 is a cable 17 which has attached to one end thereof a heavy weight 18. This weight 18 is of such shape and weight, when dropped on the ground, as to be capable of generating seismic waves of sufficient magnitude to be propagated through the earth a sufficient distance to be detected by geophones. Hence, this weight weighs in the order of thousands of pounds, a lighter weight being for most applications unsuitable for the purposes of seismic prospecting.

The cable 17 extends from the weight 18 over sheave 16 and is wound about the sheave arrangements 19 and 20 included in block and tackle system 14. The other end of cable 17 is attached to a fixed member 9 positioned on the floor of the truck 10. Sheaves 19 and 20 rotate about shafts 21 and 22, respectively, upon movement of cable 17. Sheaves 19 are connected to a movable sheave block 23 which sheave block is connected to a piston 24 which is hydraulically operated to raise the weight 18.

Figure 3:
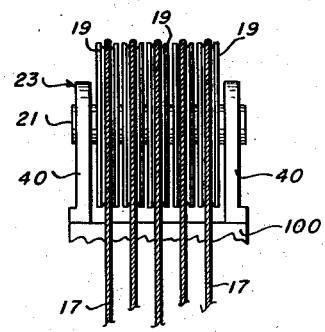
Fig. 3 is a side fragmentary view of the upper end of Fig. 2.
Figure 2:
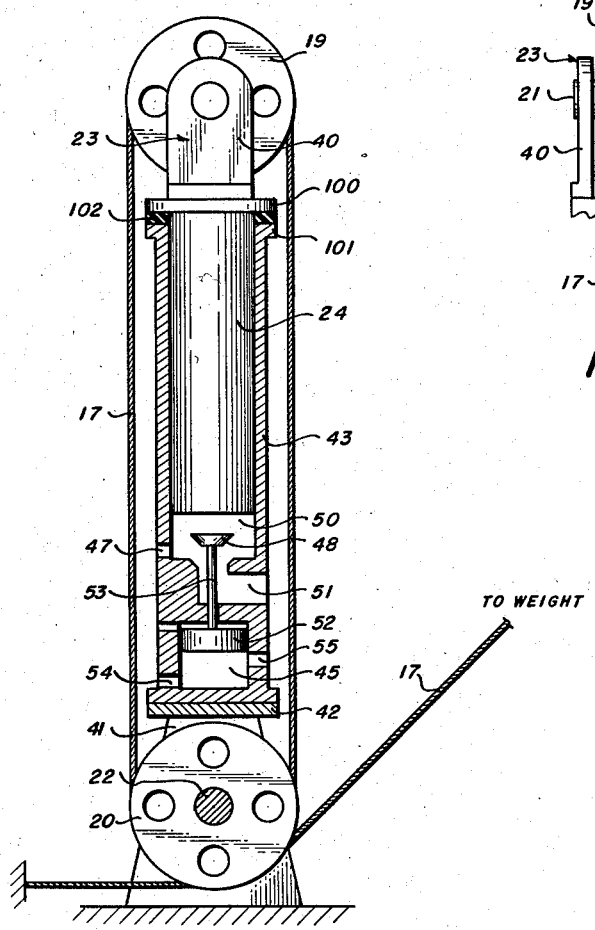
Fig. 2 is a side view of the block and tackle system and hydraulic system of our new weight handling mechanism.

The inner mechanism of the valve and cylinder arrangement of the block and tackle system is best illustrated in Figs. 2 and 3. As shown in Figs. 2 and 3, the block and tackle system consists of the rotatable sheave arrangements 19 and 20 about which is wound the cable 17. The shaft 21 of the rotatable sheaves 19 is connected between the upstanding portions 40 of a movable sheave block 23. The rotatable sheaves 20 have their shaft 22 connected between the supports of a stationary sheave block 41 which is attached to base plate 42. Mounted on base plate 42 is a cylinder assembly 43 which has provided in the lower end thereof a valve operating chamber 45.

A movable piston 24 is slidably arranged in the upper end of cylinder 43 and is adapted to move longitudinally within cylinder 43 in response to hydraulic fluid which is caused to enter inlet 47 in the cylinder 43, the pressure of the fluid entering inlet 47 causing the movement of the piston 24. The movement of piston 24 effects the movement of the movable sheave block 40 and the resultant raising of the heavy weight 18. A discharge valve 48 is disposed within the space 50 defined by the lower extremity of piston 24 and the upper wall of chamber 45. The discharge valve 48 is utilized to cause the substantially instantaneous discharge of the hydraulic fluid contained in the space 50 after the weight 18 has been raised and it is desired to drop said weight.

The hydraulic fluid is discharged through discharge port 51 in cylinder 43. Located within the chamber 45 is a discharge valve actuating piston 52 which is connected to the valve 48 by means of a connecting shaft 53. Ports 54 are provided in the cylinder 43 so that when it is desired to drop the weight 18 fluid may be flowed into chamber 45 causing the movement of valve actuating piston 52 upwardly as seen in Fig. 2 and the simultaneous movement of discharge valve 48 to open said valve to permit substantially instantaneous discharge of the fluid contained in chamber 50 through port 51 thus allowing weight 18 to fall freely. Discharge valve 48 and the openings controlled thereby are so sized that the fluid in space 50 can escape therefrom quickly enough to effect the free fall of the weight. Hence, the piston and weight come to rest at about the same time, the piston slightly ahead of the weight. Therefore, no slack develops in the strands of cable between the collapsing two-block system. The fluid in chamber 45 is discharged back to the storage tank 11 through discharge port 55. The downward movement of piston 24 is limited because the diameter of the base 100 of movable block 40 is greater than the diameter of piston 24. Therefore, base 100 contacts shoulder 101 of cylinder 44. Rubber padding 102 is positioned between base 100 and shoulder 101 to prevent the direct impingement of base 100 upon shoulder 101.

Figs. 4, 5 and 6 show in diagrammatic views the hydraulic conduit system and the manner in which it is operated to control the various operations of the block and tackle system. Referring to Fig. 4 there is shown the storage tank 11 which is hydraulically connected to a gear-type pump 12 by means of a fluid conduit 60. The gear-type pump 12 consists of a series of gears indicated by numeral 61 which gears are connected by means of a shaft to the power means of the truck and hence operated by the power means of the truck 10. The mechanism of Fig. 4 is shown in the standby position which is the position of the mechanism when the system is not being used to raise or drop the weight 18. In the stand-by position the cylindrical member 62 of the control valve 13 is positioned so as to cause fluid which is pumped by gear-type pump 12 through fluid conduit 64 to flow through control valve 13, fluid conduit 65 and back to the storage tank 11.

In order to operate the three-way control valve, an electrical system is provided which includes a double throw switch 66 which controls a source of voltage such as a battery 67. When the double throw switch 66 is raised to the lift position, contact is made with contact 68 and an electric current is conducted from battery 67 to a solenoid 69 thereby causing the cylindrical member 62 in control valve 13 to be moved to the lift position or counter clockwise as seen in Fig. 5. When it is desired to drop the weight 18, the double-throw switch 66 is moved to the drop position to contact electrical contact 70 and current is conducted from battery 67 to the solenoid 71 causing the movement of the cylindrical member 62 in control valve 13 to a position to cause the free fall of weight 18.

The lift position of the control valve 13 is shown in Fig. 5. As shown in Fig. 5, the valve port 72 of cylindrical member 62 is rotated from fluid conduit 65 to fluid conduit 73 and valve ports 74 and 75 are rotated to connect fluid conduits 65 and 76. The fluid from tank 11 is then pumped through fluid conductor 73 to the space 50 below the piston 24 and above the discharge valve 48 thereby causing the movable piston 24 to be moved upwardly and the weight 18 raised. Any fluid which is present in the chamber 45 is conducted back to the tank 11 through fluid conduits 76 and 65. If too much pressure should build up against the fully extended piston 24, a relief valve 77, shown in Fig. 4, is adapted to be moved against a spring bias 78 so that any excess fluid pressure is conducted through fluid conductor 79 to the fluid storage tank 11.

Fig. 6 shows the position of control valve 13, piston 24 and valve 48 after the double throw switch 66 has been moved to the drop position to contact electrical contact 70. As shown in Fig. 6, valve port 72 has been rotated to coincide with fluid conductor 76. Fluid is then pumped from fluid tank 11 through fluid conductor 64 and fluid conductor 76 to the chamber 45. The fluid pressure under the piston 52 raises the piston 52 and the discharge valve 48 to which piston 52 is attached to thereby cause the rapid discharge of fluid from below piston 24 back to the storage tank 11 through fluid conductor 80. The piston 24 is substantially instantaneously dropped and the movable sheave 19 drops with said piston thereby causing the free fall of weight 18.

In operation, therefore, during the periods when the weight 18 is neither being raised nor dropped, the double throw switch 66 is left in the stand-by position and the fluid is merely circulated through the pump 12 back to the tank 11 as shown in Fig. 4. When it is desired to raise the weight 18, the operator merely throws the double throw switch 66 to the lift position thereby actuating solenoid 69 and moving cylindrical member 62 to a position so as to cause the flow of fluid through fluid conduit 73 to the cylinder thereby causing the raising of piston 24 and the raising of the weight. After the weight has been raised to its upper position and it is desired to drop same, the operator throws the double throw switch 66 to the drop position thereby actuating solenoid 71 and moving cylindrical member 62 to a position so as to cause the flow of fluid through liquid conduit 76 to chamber 45 thereby raising discharge valve 48 causing the rapid discharge of fluid from chamber 50 through liquid conduit 80 back to the tank 11. The weight 18 then falls upon the ground and seismic waves are generated and detected.

The system is designed so that the piston 24 and weight 18 reach their lowermost poistions at about the same time. They, therefore, come to rest at about the same time and so no slack develops in the strands of the cable. For example, when using two 5-sheave blocks mounted on opposite ends of the piston-cylinder arrangement, the system is designed so that piston 24 falls with about one-tenth the acceleration of the falling weight; hence, they come to rest at approximately the same time. Hence, it can be seen we have devised a new weight handling mechanism for use in seismic prospecting which does not utilize any braking equipment and does not result in unraveling of the cable and provides for quick and effective handling of the weight.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What we wish to claim as new and useful is:

1. Apparatus for generating seismic waves comprising a truck, a substantially vertically extending cylinder formed to provide discharge port means adjacent the lower end thereof and arranged on said truck, a piston slidably arranged in said cylinder, a first rotatable sheave means poistioned above said cylinder and arranged on said piston for movement therewith, a second rotatable sheave means mounted on said truck below said cylinder, a third rotatable sheave means supported on said truck spaced from said first and second sheave means, an unguided, substantially free-falling heavy weight adapted to impinge on the earth's surface when dropped, a cable arranged on said sheave means having end attached to said truck and the other end attached to said weight, hydraulically-operated valve means arranged in said cylinder below said piston adapted to control the flow of fluid through said port means, and a hydraulic system arranged on said truck adapted to supply fluid to said cylinder to move said piston upwardly thereby elevating said associated weight and to actuate said valve means to discharge fluid from said cylinder, said port means being of sufficient size to cause substantially instantaneous discharge of fluid contained in said cylinder to thereby permit substantially free fall of said piston and associated weight.

2. Apparatus as recited in claim 1 wherein said hydraulic system includes a source of fluid pressure and an electrically-operated control valve having one position fluidly connecting said source of fluid pressure and said cylinder below said piston and another position fluidly connecting said source of fluid pressure and said hydraulically-operated valve means.

References Cited in the file of this patent

UNITED STATES PATENTS

| | | |
|---|---|---|
| 1,602,572 | Cox | Oct. 12, 1926 |
| 2,415,014 | Luebbers | Jan. 28, 1947 |
| 2,494,071 | Veale | Jan. 10, 1950 |
| 2,499,605 | Nicolson | Mar. 7, 1950 |
| 2,530,577 | Gurries | Nov. 21, 1950 |
| 2,659,583 | Dorkins | Nov. 17, 1953 |
| 2,695,764 | Grebe | Nov. 30, 1954 |